United States Patent
Beller et al.

[15] 3,661,231
[45] May 9, 1972

[54] SPOT-TYPE DISC BRAKE

[72] Inventors: Hans Albert Beller, Bad Vilbel; Jochen Burgdorf, Offenbach, M., both of Germany

[73] Assignee: ITT Industries, Inc., New York, N.Y.

[22] Filed: July 13, 1970

[21] Appl. No.: 54,178

[30] Foreign Application Priority Data

July 24, 1969 Germany..................P 19 37 555.4

[52] U.S. Cl..........................188/72.4, 74/18.2, 92/117, 92/168
[51] Int. Cl.............................................F16d 55/18
[58] Field of Search ..............188/72.4, 72.5, 73.4, 73.3, 188/264 I; 92/117, 168; 74/18.2

[56] References Cited

UNITED STATES PATENTS

| | | |
|---|---|---|
| 3,416,634 | 12/1968 | Swift......................188/73.3 |
| 3,525,420 | 8/1970 | Honick et al. ..........188/72.4 |
| 3,528,301 | 9/1970 | Wasmer....................92/168 X |
| 3,532,192 | 10/1970 | Falk........................188/73.4 |

FOREIGN PATENTS OR APPLICATIONS 75,600 6/1961 France...................188/72.4

Primary Examiner—George E. A. Halvosa
Attorney—C. Cornell Remsen, Jr., Paul W. Hemminger, Walter J. Baum, Charles L. Johnson, Jr., Philip M. Bolton, Edward Goldberg and Menotti J. Lombardi, Jr.

[57] ABSTRACT

A floating spot-type disc brake for vehicles having a fixed carrier extending over the edge of the disc, brake shoes slidably mounted on each side of the carrier and a hydraulic actuator on one side of the disc with a frame for transmitting the actuating force to the brake shoe on the other side of the disc, the actuator being supported by a bore in the carrier in which the front of the piston is slidable. The frame is supported on one side by the actuator housing and on the other side by the brake shoes.

9 Claims, 4 Drawing Figures

Inventors
HANS A. BELLER
JOCHEN BURGDORF
Attorney 3,661,231

SPOT-TYPE DISC BRAKE

BACKGROUND OF THE INVENTION

This invention relates to vehicle disc brakes of the floating type having axially fixed rotating disc, an actuator on one side of the disc acting directly on a brake shoe on the same side of the disc and means for transmitting the actuating force to a brake shoe on the other side of the disc and particularly to a brake of this type having a fixed carrier for supporting and guiding the brake parts and a floating frame embracing the disc for transmitting the actuating force.

In the design of this type of disc brake it is important that the floating parts be free to move easily in an axially direction and that dirt and corrosion do not reduce this freedom and cause jamming of the parts. It is desirable to achieve this without the use of expensive manufacturing and assembly techniques.

In a known brake of this type the brake frame is guided in axially extending milled grooves in the brake carrier. A spring of some type is used to position the frame with respect to the grooves and to reduce the noise and chatter caused by movement of the frame within the guide grooves.

SUMMARY OF THE INVENTION

It is an object of this invention to provide an inexpensive guide and support for the brake frame which does not require the use of springs and which is not subject to fouling and corrosion.

It is a further object of this invention to provide precise and accurate aligning of the brake components without use of additional parts which must be machined to close tolerances.

This invention achieves these objects by supporting the actuator and frame on one side of the disc with a ring fitted between the exposed part of the actuator piston and a bore in the brake carrier adjacent to the brake disc. The ring positions the actuator with respect to the fixed carrier while the frame is attached to the outside of the actuator. The part of the frame on the other side of the brake disc is supported by attaching it to a part, such as the brake shoe backing plate, which is movable in an axial direction with respect to the fixed brake carrier.

In the embodiment of the invention shown, the supporting ring is axially spaced from the hydraulic actuator housing to provide a gap which may be enclosed by means of a protective cover and which may be filled with a lubricant to protect and lubricate the actuator piston.

By means of this construction the milled grooves in the carrier are eliminated and the friction between the frame and the carrier is reduced.

The support and guide ring may be enclosed in an elastomeric part which serves as a dust cover, scraper ring and a shock absorber and damper between the piston and the carrier. One end of this part, which is in the form of a ring, is attached to a groove in the outside front surface of the actuator housing. The other end may be attached to the front end of the piston to provide a complete seal. The middle of the elastomeric ring is pressed between the supporting ring and the carrier. Another part of the elastomeric ring extends between the supporting ring and the outside of the piston. This portion includes a wiper edge which bears against the piston.

DESCRIPTION OF PREFERRED EMBODIMENTS

Figure 1:
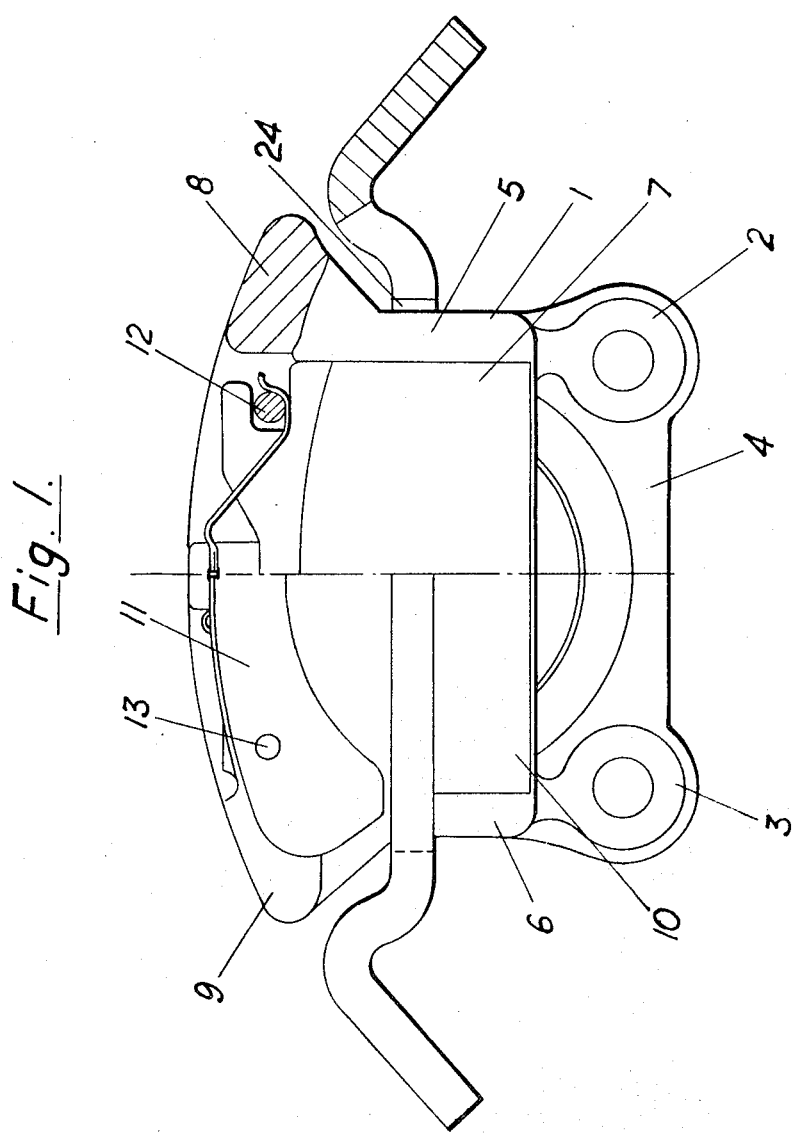
FIG. 1 is an axial view partially broken away of a spot-type disc brake embodying the present invention.
Figure 2:
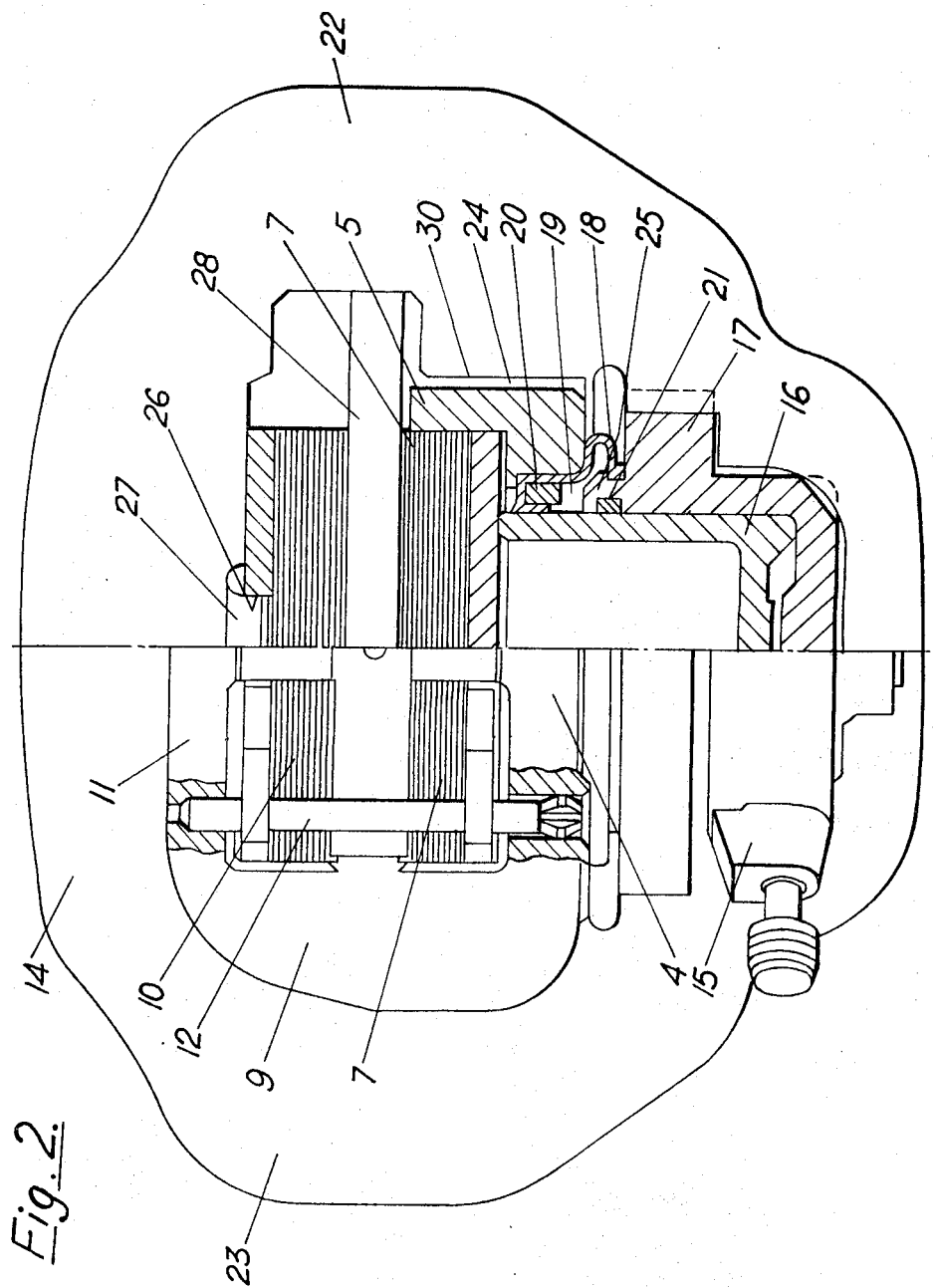
FIG. 2 is a plan view partly broken away showing the disc brake of FIG. 1.
Figure 3:
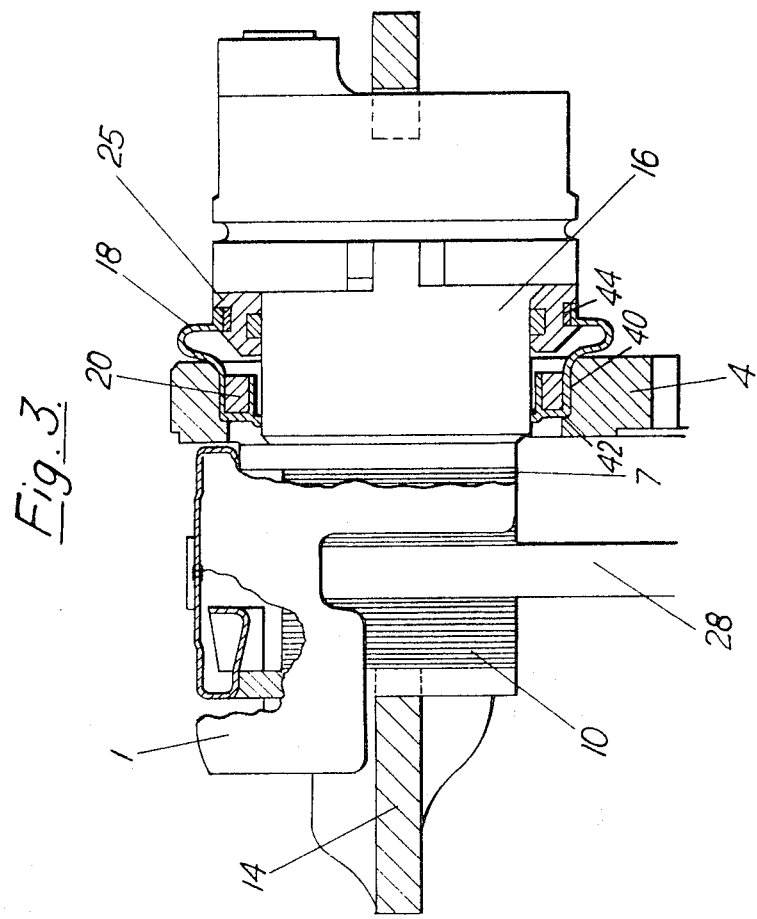
FIG. 3 is a side view partially broken away of the disc brake shown in FIG. 1.

Referring particularly to FIGS. 1-3 there is shown a spot-type floating disc brake having a fixed carrier 1 adapted to be attached to a non-rotating part of the vehicle by means of bolt holes 2 and 3. A part 4 of the brake carrier forms a substantially flat surface parallel to and adjacent a rotatable brake disc 28. Ribs 5 and 6 on the carrier form side walls for receiving the frictional forces which act upon a brake shoe 7 fitted between the ribs for movement in an axial direction toward the disc. The brake carrier has two peripherally spaced arms 8 and 9 which project over the edge of the brake disc and which are connected on the other side by a crosspiece 11. A brake shoe 10 is positioned between these arms on the other side of the disc for movement in an axial direction toward the disc. The brake shoes 7 and 10 are supported in a radial direction by means of retaining pins 12 and 13, the ends of which fit into bores on the crosspiece 11 and the carrier 4. A hydraulic actuator assembly including a cylinder 17 and a piston 16 is supported and positioned by the carrier 4. The carrier plate 4 has a stepped circular bore 40 with an abutment 42. A stationary guide ring 20 is fitted within this bore and provides a support and guide for the actuator piston 16. In the embodiment shown the guide ring 20 is a metal ring which is vulcanized to an elastomeric member 18. The elastomeric material, which covers the inner and outer perimeter of the ring, provides a cushioning and dampening material between the piston, ring and carrier plate. One end of the elastomeric member 18 fits into a groove 44 in the outside front surface of the actuator housing to form a protective cover for the part of the piston which slides in and out of the cylinder. An edge at the front of the elastomeric part rubs against the entire perimeter of the piston to provide a scraper action.

A frame 14 in the form of a substantially flat sheet metal part having a central opening embraces the edge of the disc to transmit the operating force from the actuator to the brake shoe on the other side of the disc. A recess on one side of the frame cooperates with grooves in the actuator housing to support and guide the frame on one side of the disc. The other side of the frame is supported by means of an extension 27 on the frame which engages a non-circular bore in the backing plate of the brake shoe 10 on the other side of the disc. The non-circular bore provides a support for the frame while preventing the rotation of the frame with respect to the brake shoe.

The construction described above allow free movement of the frame, brake shoes and actuator in an axial direction while preventing movement in the radial or peripheral direction. The fixed brake carrier provides the support for transmitting all brake forces to the vehicle frame. The piston is positioned for movement in an axial direction with respect to the brake carrier. This provides a support and guide for the cylinder and for the brake frame which is mounted at one side on the cylinder. The other side of the brake frame is supported by the brake shoe which is axially movable with respect to the disc.

When hydraulic pressure is applied to the cylinder chamber the piston acts against the brake shoe 7 while the reaction force of the cylinder acts in an axial direction on the frame 14. The left side of the frame 14 as seen in FIG. 3 acts against the brake shoe 10 to force it against the brake disc 28.

To provide lubrication the space 19 enclosed by the protective cover 18 is filled with a lubricant. The scraper ring, which is an integral part of the protective cover 18, provides a seal for the lubricant and a wiper for the piston.

Figure 4:
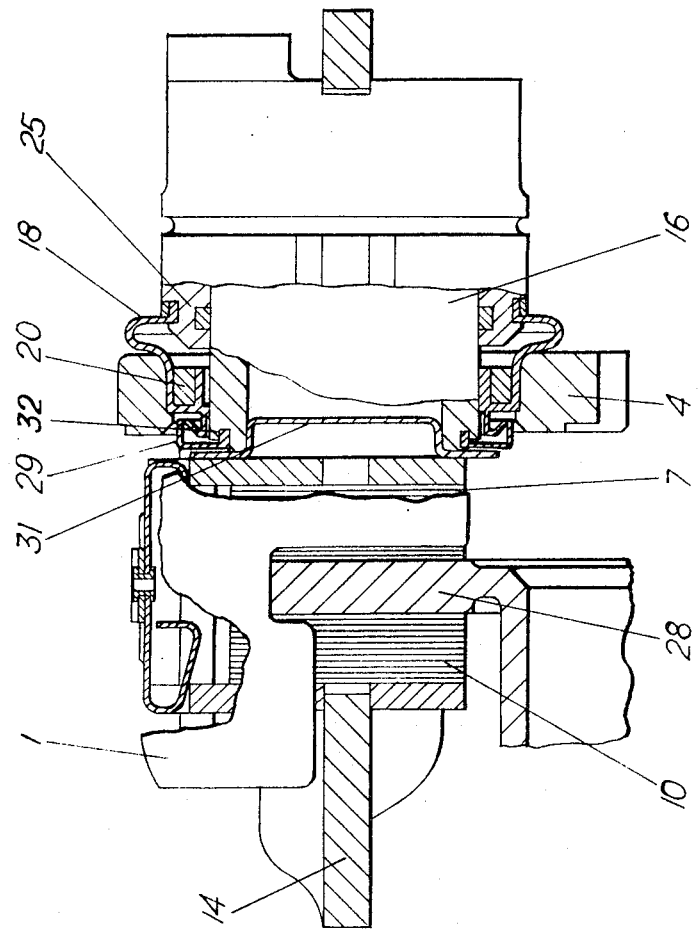
FIG. 4 is a side view partially broken away of another embodiment of the invention.

FIG. 4 shows another embodiment of the invention which is exactly like that shown in FIGS. 1-3 except as described herein. In this embodiment a sheet metal part 31 is fitted between the brake shoe and the piston. This part is positioned by means of a cup-shaped center portion which fits into a bore in the front face of the piston. This sheet metal part prevents the piston from losing its guide when the piston is retracted into the cylinder after replacement of the brake shoes. This sheet metal part also acts as a heat shield to protect the actuator from the heat developed during braking. In this embodiment of the invention the protective elastomeric cover 18 has a forward portion which fits into an annular groove in the front face of the piston. This is trapped in position by the sheet metal part 31 as will be evident from FIG. 4. This provides a complete shield for preventing dirt from reaching the smooth outer surface of the piston.

An advantage of either embodiment described above is that the supporting bore for the guide ring is in the same axial direction as the other bores in the brake carrier. Therefore, the supporting bore can be conveniently produced at the same time by precision machining. Because of the close fit of the piston in the cylinder, the piston and the supporting bore with the guide ring is now utilized as a precise guide for the brake parts.

In order to avoid fouling and corrosion of the wet operating part of the piston, even after several pad replacements, the axial length of the part of the piston which still protrudes out beyond the cylinder and guide ring in the retracted position is as great as the thickness of the pads. In this way the part of the piston traveling out of the piston guide in the course of the brake pad wear which is subject to fouling gets moved beyond the sealing ring after pad replacement.

While we have described above the principles of our invention in connection with specific apparatus it is to be clearly understood that this description is made only by way of example and not as a limitation to the scope of our invention as set forth in the accompanying claims.

We claim:
1. A spot-type disc brake comprising:
a rotating brake disc;
a non-rotating brake carrier having a circular guide bore, said circular guide bore having its axis parallel to the axis of said disc;
a first brake shoe and its associated backing plate disposed on one side of said disc slidably mounted on said carrier in communication with said guide bore;
a second brake shoe and its associated backing plate disposed on the other side of said disc slidably mounted on said carrier;
a guide ring disposed within said guide bore;
an actuator piston disposed on said one side of said disc, said actuator piston having one end thereof supported by said guide ring for movement along said guide bore to actuate said first brake shoe and its associated backing plate;
a hydraulic actuator cylinder slidable on the other end of said actuator piston;
an axially movable frame for transmitting the actuating force of said actuator piston to said second brake shoe and its associated backing plate, said frame being supported on said one side of said disc by said actuator cylinder and on said other side of said disc by a non-circular bore in said backing plate of said second brake shoe; and
a protective elastomeric cover having one end thereof secured to said actuator cylinder adjacent said brake carrier and the other end thereof secured between said guide ring and the inner surface of said guide bore.

2. A brake according to claim 1, wherein
said other end of said cover extends beyond the inner surface of said guide bore at its securing point to a point on said guide ring to provide elastomeric material between said guide ring and said actuator piston.

3. A brake according to claim 2, wherein
said cover provides an elastomeric material wiper about the perimeter of the longitudinal surface of said actuator piston.

4. A brake according to claim 3, wherein
said guide ring has a polygon cross section.

5. A brake according to claim 4, wherein
said guide bore includes on its inner surface a shoulder and said other end of said cover is secured between said guide ring and said shoulder.

6. A brake according to claim 5, wherein
the maximum axial length of said one end of said actuator piston protruding out of said actuator cylinder is at least as long as the thickness of said first and second brake shoes.

7. A brake according to claim 6, wherein
a first space is provided between said brake carrier and the adjacent end of said actuating cylinder.

8. A brake according to claim 7, wherein
a space is provided between the adjacent surfaces of said frame and said brake carrier.

9. A brake according to claim 8, wherein
said actuator piston is hollow,
a member is disposed between said actuator piston and the backing plate of said first brake shoe to enclose said hollow actuator piston; and
said cover is extended toward the backing plate of said first brake shoe and secured between said member and the adjacent end of said actuator piston.

* * * * *